(12) United States Patent  
Chen et al.

(10) Patent No.: US 9,256,701 B2
(45) Date of Patent: Feb. 9, 2016

(54) MODELING WELLBORE FLUIDS

(71) Applicant: Halliburton Energy Services, Inc., Houston, TX (US)

(72) Inventors: Dingding Chen, Tomball, TX (US); David L. Perkins, The Woodlands, TX (US); Christopher Michael Jones, Houston, TX (US); Li Gao, Katy, TX (US); Lucas Fontenelle, Houston, TX (US); Johanna Haggstrom, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 390 days.

(21) Appl. No.: 13/735,756

(22) Filed: Jan. 7, 2013

(65) Prior Publication Data

US 2014/0195215 A1    Jul. 10, 2014

(51) Int. Cl.
G06G 7/48 (2006.01)
G06G 7/50 (2006.01)
G06F 17/50 (2006.01)
E21B 43/26 (2006.01)
G06N 3/08 (2006.01)

(52) U.S. Cl.
CPC ............ *G06F 17/5009* (2013.01); *E21B 43/26* (2013.01); *G06N 3/086* (2013.01); *G06F 2217/16* (2013.01)

(58) Field of Classification Search
CPC ............ G06F 2217/16; G06F 17/5018; G06F 17/5009; G06F 2217/34; G06G 7/57; E21B 49/00; E21B 43/00; G01V 11/00
USPC ....................................... 703/9, 10
See application file for complete search history.

(56) References Cited

U.S. PATENT DOCUMENTS

| 5,056,035 A | 10/1991 | Fujita |
| 5,557,103 A * | 9/1996 | Hughes et al. ............ 250/255 |
| 7,778,781 B2 | 8/2010 | Fischer et al. |
| 2007/0011114 A1 | 1/2007 | Chen et al. |
| 2008/0228680 A1 | 9/2008 | Chen et al. |
| 2010/0040281 A1 | 2/2010 | Chen et al. |
| 2010/0248997 A1 | 9/2010 | Li et al. |
| 2011/0137566 A1 | 6/2011 | Jacobson et al. |
| 2011/0282818 A1 | 11/2011 | Chen et al. |
| 2012/0018148 A1 | 1/2012 | Bryant et al. |
| 2012/0109604 A1 | 5/2012 | Chen et al. |

OTHER PUBLICATIONS

"Adapting Crossover and Mutation Rates in Genetic Algorithms" Wen-Yang Lin, 2003.*

* cited by examiner

*Primary Examiner* — Saif Alhija
(74) *Attorney, Agent, or Firm* — Craig W. Roddy; Fish & Richardson P.C.

(57) ABSTRACT

Techniques for modeling a wellbore fluid that includes a base fluid and one or more fluid additives includes identifying a target viscosity profile of the wellbore fluid; determining an initial set of values of the fluid additives that are based at least in part on the target viscosity profile; determining, with one or more non-linear predictive models, a computed viscosity profile of the wellbore fluid and a computed set of values of the fluid additives based, at least in part, on the initial set of values of the fluid additives; comparing the computed viscosity profile and at least one of the computed set of values with a specified criteria of the wellbore fluid; and preparing, based on the comparison, an output including the computed viscosity profile and at least one of the computed set of values of a resultant wellbore fluid.

35 Claims, 8 Drawing Sheets

| | | | | Input | | | | Output |
|---|---|---|---|---|---|---|---|---|
| 1) | CRL | STB | FBK | pH | ICC 1 | ICC 2 | ICC 3 | ICC 4 | Time | VIS |
| 2) | VIS | STB | FBK | pH | ICC 1 | ICC 2 | ICC 3 | ICC 4 | Time | CRL |
| 3) | CRL | VIS | FBK | pH | ICC 1 | ICC 2 | ICC 3 | ICC 4 | Time | STB |
| 4) | CRL | STB | VIS | pH | ICC 1 | ICC 2 | ICC 3 | ICC 4 | Time | FBK |
| 5) | CRL | STB | FBK | VIS | ICC 1 | ICC 2 | ICC 3 | ICC 4 | Time | pH |

FIG. 4

US 9,256,701 B2

MODELING WELLBORE FLUIDS

TECHNICAL BACKGROUND

This disclosure relates to modeling wellbore fluids.

BACKGROUND

Hydraulic fracturing has become the dominant well completion technique and is used almost exclusively for production enhancement of low-permeability reservoirs. In many places where hydraulic fracturing is requested, using traditional water source may have cost and availability related issues. To overcome this limitation, non-traditional water sources, such as flowback, produced and waste water, are being used in fracturing operations.

DESCRIPTION OF DRAWINGS

FIG. 4 illustrates an example model for modeling a wellbore fluid.

DETAILED DESCRIPTION

Figure 1:
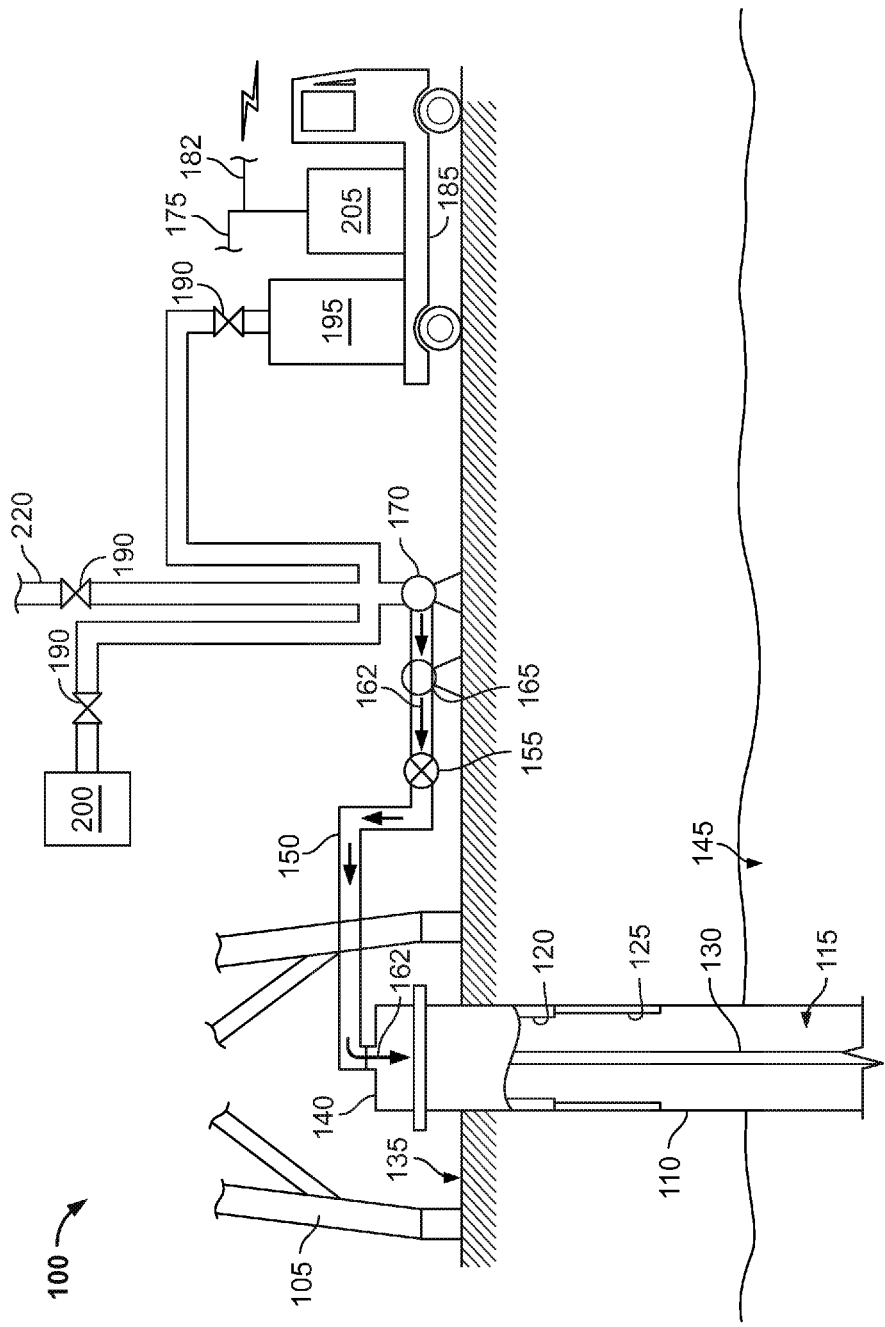
FIG. 1 illustrates an example implementation of at least a portion of a wellsite assembly in the context of a downhole operation (e.g., a fracturing operation).

This disclosure generally describes computer-implemented methods, software, and systems for modeling a wellbore fluid. For example, one general implementation for modeling a wellbore fluid that includes a base fluid and one or more fluid additives includes identifying a target viscosity profile of the wellbore fluid; determining an initial set of values of the fluid additives that are based at least in part on the target viscosity profile; determining, with one or more non-linear predictive models, a computed viscosity profile of the wellbore fluid and a computed set of values of the fluid additives based, at least in part, on the initial set of values of the fluid additives; comparing at least one of the computed viscosity profile or the computed set of values with a specified criteria of the wellbore fluid; and preparing, based on the comparison, an output including at least one of the computed viscosity profile or the computed set of values of a resultant wellbore fluid.

A first aspect combinable with the general implementation further includes identifying one or more properties of the base fluid.

In a second aspect combinable with any of the previous aspects, identifying a target viscosity profile of the wellbore fluid includes identifying a target viscosity profile of the wellbore fluid based at least in part on the properties of the base fluid.

A third aspect combinable with any of the previous aspects further includes determining at least one parameter of the base fluid based at least in part on the target viscosity profile.

In a fourth aspect combinable with any of the previous aspects, determining, with one or more non-linear predictive models, a computed viscosity profile of the wellbore fluid and a computed set of values of the fluid additives based, at least in part, on the initial set of values of the fluid additives includes determining, with a neural network forward model, the computed viscosity profile of the wellbore fluid based, at least in part, on the initial set of values; and determining, with a neural network inverse model, the computed set of values of the fluid additives and the at least one parameter of the resultant wellbore fluid based, at least in part, on the initial set of values.

A fifth aspect combinable with any of the previous aspects further includes training the neural network with historical data including viscosity profiles of the wellbore fluid that includes a conventional water source as the base fluid.

In a sixth aspect combinable with any of the previous aspects, determining the initial set of values further includes identifying the initial set of values utilizing a design of experiments database.

In a seventh aspect combinable with any of the previous aspects, the computed set of values is further based on the target viscosity profile or the computed viscosity profile.

An eighth aspect combinable with any of the previous aspects further includes determining, based on the comparison, that the computed set of values are within a threshold tolerance of the initial set of values.

A ninth aspect combinable with any of the previous aspects further includes determining, based on the comparison, that at least one of the computed set of values is not within a threshold tolerance of the initial set of values.

A tenth aspect combinable with any of the previous aspects further includes adjusting the computed set of values utilizing a genetic algorithm.

An eleventh aspect combinable with any of the previous aspects further includes determining, using a neural network forward model, an updated viscosity profile of the wellbore fluid based on at least the adjusted set of values.

In a twelfth aspect combinable with any of the previous aspects, utilizing the genetic algorithm further includes encoding the computed set of values as n-bit strings.

In a thirteenth aspect combinable with any of the previous aspects, utilizing the genetic algorithm further includes selecting one or more n-bit strings.

In a fourteenth aspect combinable with any of the previous aspects, utilizing the genetic algorithm further includes mutating one or more bits of at least one of the selected n-bit strings.

In a fifteenth aspect combinable with any of the previous aspects, utilizing the genetic algorithm further includes crossing-over at least two of the selected n-bit strings.

In a sixteenth aspect combinable with any of the previous aspects, the one or more properties of the base fluid include ion content concentration levels.

In a seventeenth aspect combinable with any of the previous aspects, the at least one parameter of the resultant wellbore fluid includes a pH level.

In an eighteenth aspect combinable with any of the previous aspects, the fluid additives include a cross-linking constituent, a stabilizer constituent, and a breaker constituent.

Various implementations of a computing system according to the present disclosure may have one or more of the following features. For example, available resources (e.g., flowback water, produced water) for hydraulic fracturing are maximized; cost reduction in candidate formulation selection and real fluid testing (e.g., minimize cost by choosing design with cheaper fluid additives); maximize opportunity to use existing database for diverse applications; effective diagnostic tool for problem detection, data/model modification and risk minimization; straightforward in software implementation and product commercialization; enable new technologies for down hole mixing can be applied to surface friction modeling and improve design models.

The details of one or more implementations of the subject matter of this specification are set forth in the accompanying drawings and the description below. Other features, aspects, and advantages of the subject matter will become apparent from the description, the drawings, and the claims. Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

FIG. 1 illustrates one implementation of at least a portion of a wellsite assembly 100 in the context of a downhole (e.g., fracturing) operation. A wellbore 110 is formed from a terranean surface 135 to and/or through a subterranean zone 145. The illustrated wellsite assembly 100 includes a drilling rig 105; a tubing system 150 coupled to a fluid valve 155, a pump 165, a mixer 170, a liquid source 220; and a frac fluid truck 185 coupled to the tubing system 150. Although illustrated as onshore, the wellsite assembly 100 and/or wellbore 110 can alternatively be offshore or elsewhere. Further, although described in the context of a hydraulic fracturing operation, the wellsite assembly 100 may also illustrate another downhole operation that uses a fluid (e.g., a liquid, slurry, gel, or other fluid) such as an acidizing operation.

The wellbore 110, at least a portion of which is illustrated in FIG. 1, extends to and/or through one or more subterranean zones under the terranean surface 135, such as subterranean zone 145. Wellbore 110 may allow for production of one or more hydrocarbon fluids (e.g., oil, gas, a combination of oil and/or gas, or other fluid) from, for example, subterranean zone 145. The wellbore 110, in some aspects, is cased with one or more casings. As illustrated, the wellbore 110 includes a conductor casing 120, which extends from the terranean surface 135 shortly into the Earth. Other casing 125 is downhole of the conductor casing 120. Alternatively, some or all of the wellbore 110 can be provided without casing (e.g., open hole). Additionally, in some implementations, the wellbore 110 may deviate from vertical (e.g., a slant wellbore or horizontal wellbore) and/or be a multilateral wellbore.

A wellhead 140 is coupled to and substantially encloses the wellbore 110 at the terranean surface 135. For example, the wellhead 140 may be the surface termination of the wellbore 110 that incorporates and/or includes facilities for installing casing hangers during the well construction phase. The wellhead 140 may also incorporate one or more techniques for hanging tubing 130, installing one or more valves, spools and fittings to direct and control the flow of fluids into and/or from the wellbore 110, and installing surface flow-control facilities in preparation for the production phase of the wellsite assembly 110.

The tubing system 150 is coupled to the wellhead 140 and, as illustrated, provides a pathway through which one or more fluids, such as fluid 162, into the wellbore 110. In certain instances, the tubing system 150 is in fluid communication with the tubing 130 extending through the wellbore 110. The fluid 162, in the illustrated implementation of FIG. 1, is a fracing fluid introduced into the wellbore 110 to generate one or more fractures in the subterranean zone 145.

In the implementation of FIG. 1 illustrating a hydraulic fracturing completion operation, the tubing system 150 is used to introduce the fluid 162 into the wellbore 110 via one or more portions of conduit and one or more flow control devices, such as the control valve 155, the pump 165, the mixer 170, one or more valves 190 (e.g., control, isolation, or otherwise), the liquid source 220, and the truck 185. Generally, the pump 165, the mixer 170, the liquid source 220, and the truck 185 are used to mix and pump a fracing fluid (e.g., fluid 162) into the wellbore 110.

The well assembly 100 includes gel source 195 and solids source 200 (e.g., a proppant source). Either or both of the gel source 195 and solids source 200 could be provided on the truck 185. Although illustrated as a "truck," truck 185 may represent another vehicle-type (e.g., tractor-trailer or other vehicle) or a non-vehicle permanent or semi-permanent structure operable to transport and/or store the gel source 195 and/or solids source 200. Further, reference to truck 185 includes reference to multiple trucks and/or vehicles and/or multiple semi-permanent or permanent structures.

The gel from the gel source 195 is combined with a hydration fluid, such as water and/or another liquid from the liquid source 220, and proppant from the solids source 200 in the mixer 170. Proppant, generally, may be particles mixed with fracturing fluid (such as the mixed gel source 195 and liquid source 220) to hold fractures open after a hydraulic fracturing treatment.

Notably, although the concepts described herein are discussed in connection with a hydraulic fracturing operation, they could be applied to other types of operations. For example, the wellsite assembly could be that of a cementing operation where a cementing mixture (Portland cement, polymer resin, and/or other cementing mixture) may be injected into wellbore 110 to anchor a casing, such as conductor casing 120 and/or surface casing 125, within the wellbore 110. In this situation, the fluid 162 could be the cementing mixture. In another example, the wellsite assembly could be that of a drilling operation, including a managed pressure drilling operation. In another example, the wellsite assembly could be that of a stimulation operation, including an acid treatment. Still other examples exist.

Figure 2:
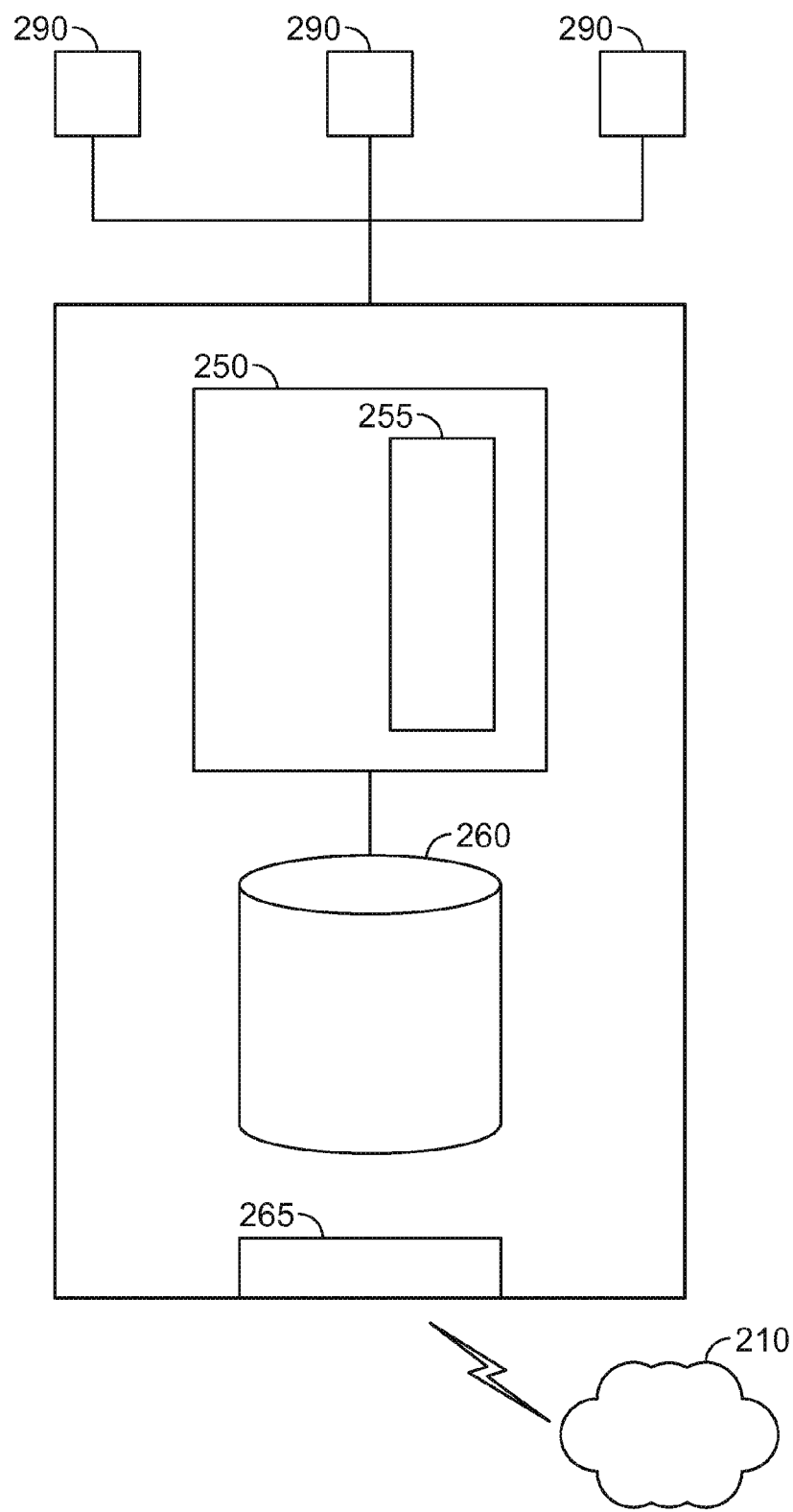
FIG. 2 illustrates an example implementation of a computer utilized at or remote from the wellsite assembly.

FIG. 2 illustrates one implementation of the computer 205 utilized at or remote from the wellsite assembly 100. Although illustrated as located on the truck 185, for example, the computer 205 may be physically located at another location, such as remote from the wellsite assembly 100 or at the wellsite but remote from the truck 185 (e.g., at a wellsite trailer or otherwise). The illustrated computer 205 includes a processor 250 executing a modeling engine 255, a memory 260, a network interface 265, and one or more input/output peripherals 290. In certain implementations, the computer 205 may be the computer used in connection with one or more operations of the well assembly 100 (e.g., data collection from the fracturing operation, controlling some or all of the gel, solids and liquid mixing, controlling some or all of the fracturing operations and/or other operations).

At a high level, the modeling engine 255 is executed by the processor 250 to model a wellbore fluid. In some examples, the modeling engine 255 models a viscosity profile of the wellbore fluid (e.g., fluid 162) using a forward model and an inverse model. More specifically, the modeling engine 255 is any application, program, module, process, or other software that models a viscosity profile of a wellbore fluid based on values of fluid additives and properties of a base fluid that include the wellbore fluid. Regardless of the particular implementation, "software" may include software, firmware, wired or programmed hardware, or any combination thereof as appropriate. Indeed, the modeling engine 255 may be written or described in any appropriate computer language including Matlab, C, C++, Java, Visual Basic, assembler, Perl, any suitable version of 4GL, as well as others.

While the modeling engine 255 is illustrated in FIG. 2 as a single module, the modeling engine 255 may include numerous other sub-modules or may instead be a single multi-tasked module that implements the various features and functionality through various objects, methods, or other processes. Further, while illustrated as internal to computer 205, one or more processes associated with the modeling engine 255 may be stored, referenced, or executed remotely. For example, a portion of the modeling engine 255 may be a web service that is remotely called, while another portion of the modeling engine 255 may be an interface object bundled for processing at a remote client. Moreover, the modeling engine 255 may be a child or sub-module of another software module or enterprise application (not illustrated) without departing from the scope of this disclosure.

Processor 250 is, for example, a central processing unit (CPU), a blade, an application specific integrated circuit (ASIC), or a field-programmable gate array (FPGA). Although FIG. 2 illustrates a single processor 250 in computer 205, multiple processors 250 may be used according to particular needs and reference to processor 250 is meant to include multiple processors 250 where applicable. In the illustrated implementation, processor 250 executes the modeling engine 255 as well as other modules as necessary. For example, the processor 250 may execute software that manages or otherwise controls the operation of the truck 185 during a completion (e.g., hydraulic fracturing or otherwise) operation.

Memory 260 is communicably coupled to the processor 250 and may include any memory or database module and may take the form of volatile or non-volatile memory including, without limitation, magnetic media, optical media, random access memory (RAM), read-only memory (ROM), removable media, or any other suitable local or remote memory component. Memory 120 may also include any other appropriate data such as VPN applications or services, firewall policies, a security or access log, print or other reporting files, HTML files or templates, data classes or object interfaces, child software applications or sub-systems, and others.

Interface 265 facilitates communication between computer 205 and other devices. As illustrated, the computer 205 may communicate with a remote monitoring location over network 210. Generally, interface 265 comprises logic encoded in software and/or hardware in a suitable combination and operable to communicate with network 210. More specifically, interface 265 may comprise software supporting one or more communications protocols associated with communications network 210 or hardware operable to communicate physical signals.

Network 210 facilitates wireless or wired communication between computer 205 and any other local or remote computer. Network 210 may be all or a portion of an enterprise or secured network. While illustrated as a single or continuous network, network 210 may be logically divided into various sub-nets or virtual networks without departing from the scope of this disclosure. Network 210 may communicate, for example, Internet Protocol (IP) packets, Frame Relay frames, Asynchronous Transfer Mode (ATM) cells, voice, video, data, and other suitable information between network addresses. Network 210 may include one or more local area networks (LANs), radio access networks (RANs), metropolitan area networks (MANs), wide area networks (WANs), all or a portion of the global computer network known as the Internet, and/or any other communication system or systems at one or more locations.

One or more peripheral devices 290 may be communicably coupled to and/or integral with the computer 205. For example, peripheral devices 290 may be one or more display devices (e.g., LCD, CRT, other display device); one or more data input devices (e.g., keyboard, mouse, light pin, or otherwise); one or more data storage devices (e.g., CD-ROM, DVD, flash memory, or otherwise) or other peripheral devices.

Figure 3:
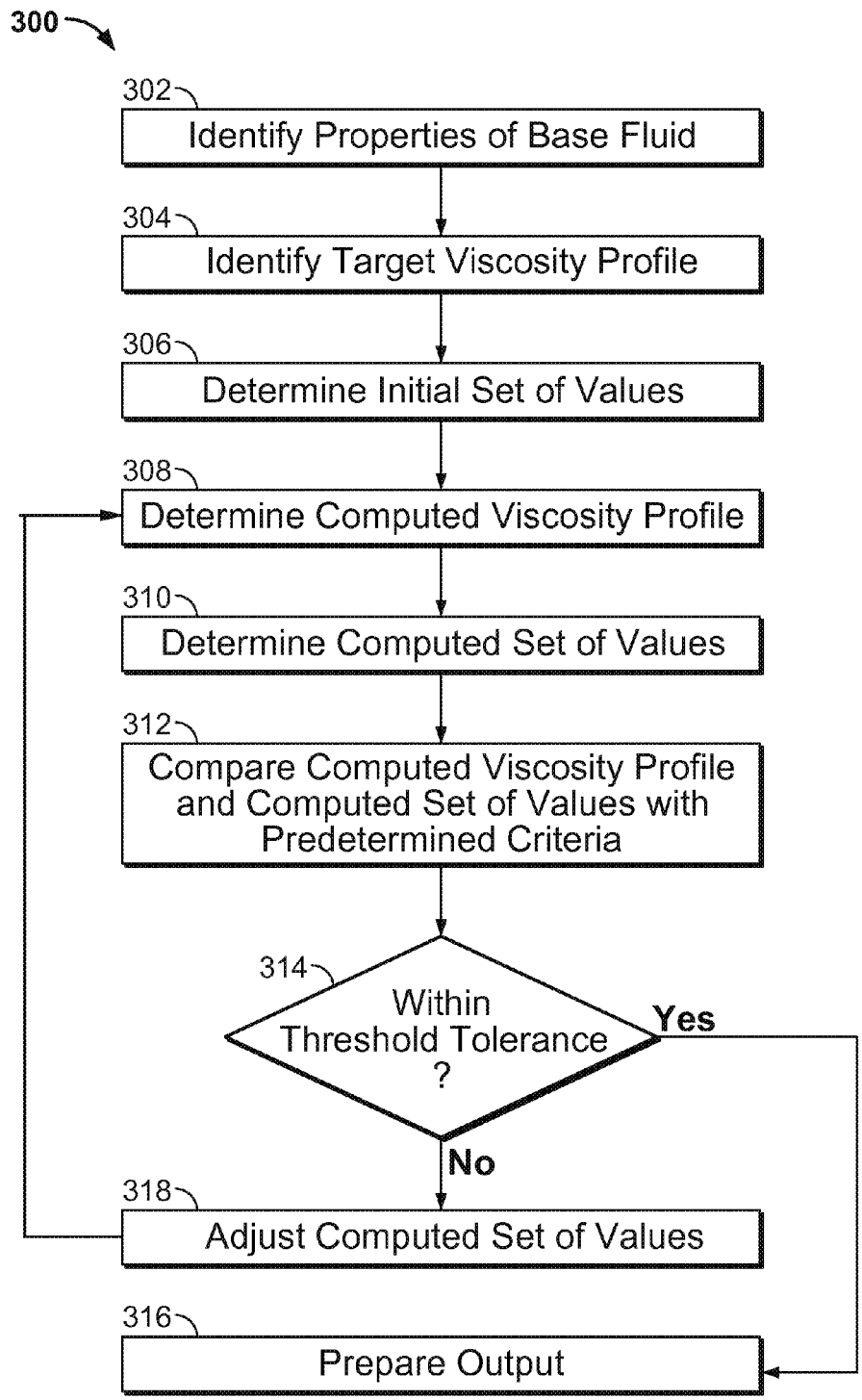
FIG. 3 illustrates an example method for modeling a wellbore fluid.

FIG. 3 is an example flowchart for modeling a wellbore fluid (e.g., fluid 162) that comprises a base fluid and one or more fluid additives. For clarity of presentation, the description that follows generally describes method 300 in the context of FIGS. 1 and 2. However, method 300 may be performed, for example, by any other suitable system, environment, software, and hardware, or a combination of systems, environments, software, and hardware as appropriate.

In step 302, one or more properties of a base fluid are identified. For example, the computer 205 identifies the properties of the base fluid. The properties are dependent on the base fluid, and specifically, the source and or type of the base fluid. In some examples, the base fluid can be provided from a traditional water source. In some example, the base fluid can be provided from a non-traditional water source, and can include flowback, produced, or waste water. The base fluid may also include the selected guar polymers as gelling agents. The gelling agents may be used as an identifier to distinguish one base fluid from the other base fluids. It may also affect the type of fluid additives for constructing wellbore fluid. The properties of the base fluid differ dependent on the type of the base fluid. In some examples, the properties of the base fluid can include, but not limited to, the following ion concentration levels of the base fluid, such as iron, potassium iodide, sulfate, boron, chloride, sodium, calcium, magnesium, strontium and barium among other ion constituents (referred to herein as ion constituent concentrations, or "ICC" for short).

In step 304, a target viscosity profile of the wellbore fluid is identified that is, in some aspects, based on the job requirements and at least in part on the properties of the base fluid. For example, the computer 205 identifies the target viscosity profile of the wellbore fluid. In some implementations, the target viscosity profile is a desired viscosity profile of the wellbore fluid that is based on specific parameters (e.g., operating parameters) for which the wellbore fluid will be utilized for (e.g., hydraulic fracturing) and in view of (e.g., based on) the properties of the base fluid. For example, the wellbore fluid (e.g., the fluid 162) can be utilized in the hydraulic fracturing operation as illustrated in FIGS. 1 and 2. To that end, the specific parameters of the wellbore fluid can be parameters associated with the hydraulic fracturing operation, such as the parameters associated with the terranean surface 135 and the subterranean zone 145. Additionally, the viscosity prolife of the wellbore fluid is a function of time after the fluid additives are mixed with base fluid such that the viscosity of the wellbore fluid for a particular time varies across the viscosity profile of the wellbore fluid. For example, at specific times associated with the hydraulic fracturing operation as illustrated in FIGS. 1 and 2, the viscosity of the wellbore fluid differs depending on the viscosity requirements of the wellbore fluid at the particular time.

In step 306, an initial set of values of the wellbore fluid design parameters or modeling parameters is estimated. The initial set of values may include the concentration values of the fluid additives and at least one control parameter of the resultant wellbore fluid. Additionally, the initial set of values is based at least in part on the target viscosity profile. For example, the computer 205 determines the initial set of values that is based at least in part on the target viscosity profile. Specifically, to provide the target (e.g., desired) viscosity profile of the wellbore fluid (e.g., fluid 162), one or more design parameters are estimated first and used in conjunction with one or more parameters of the base fluid for viscosity evaluation. Note that the initial estimates of design parameters could also be randomly generated in population (e.g., multiple parameter combinations) within the specified range with use of genetic algorithm. In some examples, the one or more fluid additives include a cross-linker ("CRL"), a pH stabilizer ("STB"), and a fluid breaker ("FBK"). The type of fluid additives may vary if different system fluids are used. In some examples, the at least one initial control parameter includes a pH level of the resultant fluid, e.g., the wellbore fluid or fracturing fluid for the job operation.

To that end, the initial set of values of the wellbore fluid design parameters is estimated. The initial set of values may be based on the target (e.g., desired) viscosity profile of the wellbore fluid. Specifically, the initial set of values of the fluid additives and the at least one initial control parameter of the resultant fluid is estimated in furtherance of providing the wellbore fluid (e.g., fluid 162) having the target viscosity profile. In some implementations, the initial set of values of the fluid additives and the at least one initial control parameter of the resultant fluid is determined utilizing a design of experiments (DOE) database. Specifically, the DOE database associates parameters of the wellbore fluid, such as ion concentration levels, fluid additive concentrations, and pH values, with viscosity profiles. Thus, based on the target viscosity profile of the wellbore fluid, the initial concentration values of the fluid additives and the at least one initial control parameter of the resultant fluid is estimated. In some examples, the DOE database includes viscosity profiles of wellbore fluids based on traditional water sources. In some examples, the DOE database includes viscosity profiles of wellbore fluids based on non-traditional water sources. In some examples, the initial set of values of the fluid additives and the initial control parameter of the resultant fluid is a range of values.

In step 308, a computed viscosity profile of the wellbore fluid is determined using a forward model. Additionally, the computed viscosity profile is based on at least the initial set of values of the design parameters of the wellbore fluid and the at least one property of the base fluid. For example, the computer 205, and specifically the modeling engine 255, determines the computed viscosity profile of the wellbore fluid using the forward model. Specifically, based on the initial set of values of the design parameters and the at least one property of the base fluid that were identified in step 306, a computed viscosity profile of the wellbore fluid (e.g., fluid 162) is determined using a forward model.

FIG. 4 illustrates an example model 400 that includes a forward model 402. In some examples, the forward model 402 is employed in viscosity prediction (e.g., in determining the computed viscosity profile of the wellbore fluid). Specifically, the forward model 402 receives as inputs the values of the fluid additives, the at least one control parameter of the resultant fluid (e.g., the pH level of the resultant fluid), and the known properties of the base fluid (e.g., the gel and ion concentration levels of the base fluid). To that end, when determining the computed viscosity profile in step 308, the forward model 402 receives as inputs the ion concentration levels of the base fluid (as identified in step 302) and the initial set of values of the fluid additives and the at least one initial control parameter of the base fluid (as determined in step 306). In some examples, the initial set of values of the fluid additives and the initial control parameter of the resultant fluid received as inputs by the forward model 402 includes the initial values of fluid additives of CRL, STB, and FBK and the initial estimate of pH level of the resultant fluid.

Additionally, the forward model 402 outputs the computed viscosity profile of the wellbore fluid (e.g., the fluid 162) based on the received inputs (e.g., the values of the fluid additives, the control parameter of the resultant fluid, and the properties of the base fluid). Specifically, the modeling engine 255, employing the forward model 402, models the viscosity profile of the wellbore fluid based on at least the initial set of values of the resultant fluid design parameters and the at least one property of the base fluid.

Figure 5:
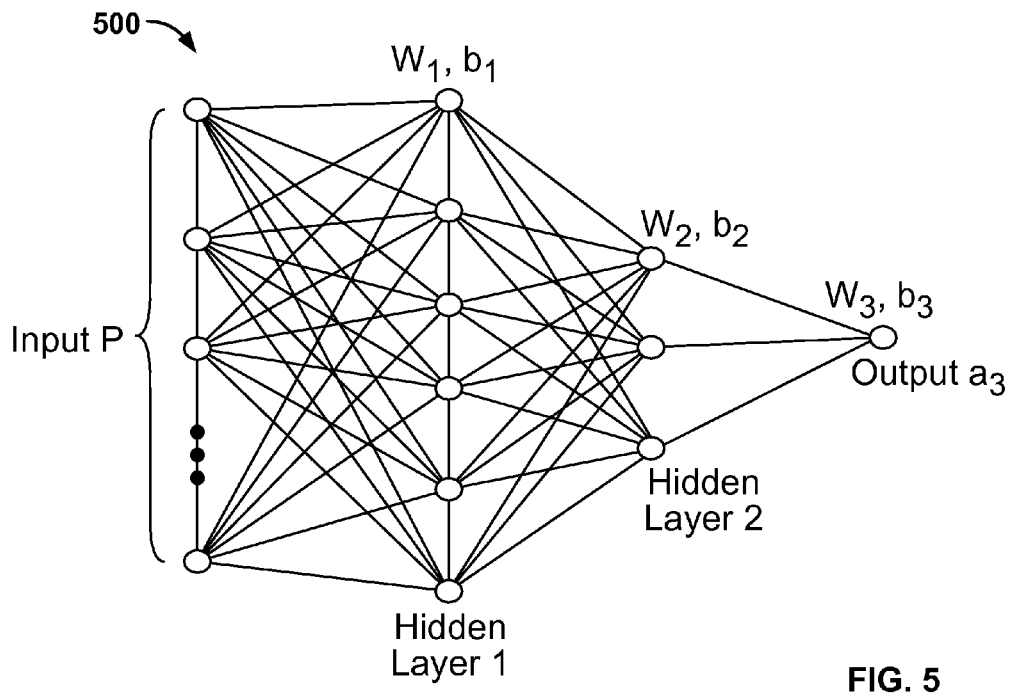
FIG. 5 illustrates an example neural network for modeling a wellbore fluid.

In some implementations, the forward model 402 is a neural network model (e.g., artificial neural network). The neural network may be a non-linear modeling platform for function approximation, and particularly, viscosity prediction. Specifically, a direct neural network modeling method may be employed by including the elapsed time after mixing as an input parameter. For each calculated viscosity profile of the wellbore fluid, the time response over the whole operational period of interest may be entered in multiple instantiations for model training and validation. In some examples, the model architecture for viscosity prediction may be a two-hidden-layer neural network, as illustrated by FIG. 5 and neural network 500, implemented with a large number of hidden nodes (e.g., 30 nodes on the first hidden layer and 20 to 30 nodes on the second hidden layer) to accurately re-construct viscosity profiles of the DOE database. The transfer function used on each hidden layer may be a hyperbolic tangent sigmoid function, and on the output layer a linear function. In computation, the neural network model may feed forward input vector P though multiple layers to calculate the output as expressed in Eq. (1) to (3), where $W_1$, $b_1$, $W_2$, $b_2$ and $W_3$, $b_3$ are the connecting, or weighting, matrices, or vectors, and $n_1$, $n_2$, $n_3$, $a_1$, $a_2$ and $a_3$ are net input and output at different layers.

$$a_1 = f_1(n_1) = \frac{e^{n_1} - e^{-n_1}}{e^{n_1} + e^{-n_1}}, \tag{1}$$
$$n_1 = W_1 \times P + b_1$$

$$a_2 = f_2(n_2) = \frac{e^{n_2} - e^{-n_2}}{e^{n_2} + e^{-n_2}}, \tag{2}$$
$$n_2 = W_2 \times a_1 + b_2$$

$$a_3 = f_3(n_3) = n_3, \tag{3}$$
$$n_3 = W_3 \times a_2 + b_3$$

In step 310, a computed set of values of the fluid additives and the at least one control parameter of the resultant fluid is determined using an inverse model to validate the initial setting. Additionally, the computed set of values of the particular fluid additive and the at least one control parameter of the resultant fluid is based on the computed viscosity from the model 402 and the initial set of values of the other fluid additives and the at least one property of the base fluid. For example, the computer 205, and specifically the modeling engine 255, determines the computed set of values of the fluid additives and the control parameter of the resultant fluid using the inverse model. Specifically, based on the computed viscosity and one or more other initial set of values of the design parameters and the property of the base fluid that were identified at step 306, the computed value of the particular design parameter is determined using an inverse model.

The model 400 further includes inverse models 404, 406, 408, 410. Specifically, each of the inverse models 404, 406, 408, 410 is employed in validating design parameter estimation (e.g., in checking the computed set of values of the fluid additives and the at least one control parameter of the resultant fluid). Specifically, each of the inverse models 404, 406, 408, 410 determines one of the fluid additive values and the at least one control parameter of the resultant fluid. For example, the inverse model 404 determines the computed value of the fluid additive CRL, the inverse model 406 determines the computed value of the fluid additive STB, the inverse model 408 determines the computed value of the fluid additive FBK, and the inverse model 410 determines the computed value of the pH level of the resultant fluid (e.g., a wellbore fluid such as a fracturing fluid or gel).

Each of the inverse models 404, 406, 408, 410 receives as input a viscosity profile of the wellbore fluid. In some examples, the input viscosity profile is the target viscosity profile of the wellbore fluid (as identified in step 304). In some examples, the input viscosity profile is the computed viscosity profile (as identified in step 308). Additionally, each of the inverse models 404, 406, 408, 410 receives as inputs the initial values of the other design parameters, (e.g., the fluid additives and the pH level of the resultant fluid), e.g. and the properties of the base fluid (e.g., the gel and ion concentration levels of the base fluid), as appropriate.

To that end, when inversely determining the computed set of values of the fluid additives and the at least one control parameter of the resultant fluid in step 310, the inverse models 404, 406, 408, 410 receive as inputs the gel and ion concentration levels of the base fluid (as identified in step 302), the initial set of values of the other fluid additives and the at least one control parameter of the resultant fluid, as appropriate (as determined in step 306), and target viscosity profile (as identified in step 304), or the computed viscosity profile (as identified in step 308).

For example, the inverse model 404 receives as input the initial values of the fluid additive STB, the fluid additive FBK, and the pH level of the resultant fluid; the inverse model 406 receives as input the initial values of the fluid additive CRL, the fluid additive FBK, and the pH level of the resultant fluid; the inverse model 408 receives as input the initial values of the fluid additive CRL, the fluid additive STB, and the pH level of the resultant fluid; and the inverse model 410 receives as input the initial values of the fluid additive CRL, the fluid additive STB, and the fluid additive FBK.

Each of the inverse models 404, 406, 408, 410 outputs the respective computed fluid additive values and the control parameter of the resultant fluid based on the received inputs (e.g., the newly computed viscosity, the initial estimates of the other fluid additives, the initial estimate of the control parameter of the resultant fluid, and the properties of the base fluid.). Specifically, the inverse model 404 outputs the computed value of CRL; the inverse model 406 outputs the computed value of the STB; the inverse model 408 outputs the computed value of the FBK; and the inverse model 410 outputs the computed value of the pH level of the resultant fluid. Thus, the modeling engine 255, employing the inverse models 404, 406, 408, 410, models the computed fluid additive values and the at least one control parameter of the resultant fluid based on the initial set of values of the fluid additives and the at least one control parameter of the resultant fluid, as appropriate.

In some examples, one or more of the inverse models 404, 406, 408, 410 determine the computed set of values of the fluid additives and the at least one control parameter of the resultant fluid in parallel. In some examples, one or more of the inverse models 404, 406, 408, 410 determine the computed set of values of the fluid additives and the at least one control parameter of the resultant fluid using the inverse model in serial.

In some implementations, one or more of the inverse models 404, 406, 408, 410 is a neural network model (e.g., artificial neural network), similar to that mentioned above to the forward model 402 and the neural network 500 of FIG. 5.

In step 312, the computed viscosity profile and at least one of the inversely computed set of values of the design parameters is compared with the target viscosity and at least one of the initial estimates of design parameters respectively. For example, the computer 205 compares the computed viscosity profile with the target viscosity profile, and compares at least one of the computed set of values of the fluid additives and pH level with corresponding initial estimates of the same parameters using a predetermined criteria.

In some implementations, the computed viscosity profile is compared to the target (e.g., desired) velocity profile (as identified in step 304). In some implementations, one or more of the computed set of values of the fluid additives and the parameter of the resultant fluid is compared to the initial set of values of the fluid additives and the parameter of the resultant fluid, respectively (as identified in step 306).

In some examples, the predetermined criteria can be associated with a threshold tolerance of the computed viscosity profile and the computed set of values of the fluid additives and the parameter of the resultant fluid in view of the target viscosity profile and the initial set of values of the fluid additives and the parameter of the resultant fluid, respectively. The predetermined criteria can also be associated with a maximum iteration or generation number for an optimization loop.

In step 314, it is determined, based on the comparison, whether the inversely computed set of values of the design parameters are within the threshold tolerance of the initial set of values of the design parameters. For example, the computer 205 determines whether the computed set of values is within the threshold tolerance of the initial set of values. In some implementations, the computed viscosity profile is compared to the target (e.g., desired) viscosity profile (as identified in step 304) to determine whether the computed viscosity profile is within a threshold tolerance of the target (e.g., desired) viscosity profile.

In step 316, it is determined, based on the comparison, that the computed set of values of the fluid additives and the at least one parameter of the resultant fluid are within the threshold tolerance of the initial set of values of the fluid additives and the at least one parameter of the resultant fluid. In response, an output is prepared comprising at least one of the computed viscosity profile and the computed set of values of the fluid additives and the at least one parameter of the resultant fluid. Additionally, the output is based on the comparison of at least one of the computed viscosity profile and the computed set of values of the fluid additives and the parameter of the resultant fluid with the predetermined criteria. Specifically, the output is prepared (comprising at least one of the computed viscosity profile and the computed set of values of the fluid additives and the at least one parameter of the resultant fluid) in response to determining that at least one of the computed viscosity profile and the computed set of values of the fluid additives and the at least one parameter of the resultant fluid is within a respective threshold tolerance of the target (e.g., desired) viscosity profile and the initial set of values of the fluid additives and the at least one parameter of the resultant fluid. For example, the computer 205 prepares the output comprising at least one of the computed viscosity profile and the computed set of values of the fluid additives and the at least one parameter of the resultant fluid.

In some examples, the output is prepared for display on a graphical user interface (GUI) associated with a user.

In step 318, it is determined, based on the comparison, that the at least one of the computed set of values of the fluid additives and the at least one parameter of the resultant fluid it not within the threshold tolerance of the initial set of values of the fluid additives and the at least one parameter of the resultant fluid. In response, the computed set of values of the fluid additives and the at least one parameter of the resultant fluid is adjusted. For example, the computer 205 adjusts (one or more of) the computed set of values of the fluid additives and the at least one parameter of the resultant fluid. Specifically, in response to determining, based on the comparison, that the at least one of the computed set of values of the fluid additives and the at least one parameter of the resultant fluid it not within the threshold tolerance of the initial set of values of the fluid additives and the at least one parameter of the resultant fluid, the computed set of values of the fluid additives and the at least one parameter of the resultant fluid is adjusted.

Subsequent to adjusting the computed set of values of the fluid additives and the at least one parameter of the resultant fluid to provide an adjusted set of values of the fluid additives and the at least one parameter of the resultant fluid, an updated viscosity profile of the wellbore fluid is determined using a forward model, similar to determining the computed viscosity profile of the wellbore fluid as mentioned above in step 312. Additionally, the updated viscosity profile is based on at least the adjusted set of values of fluid additives and the at least one parameter of the resultant fluid. For example, the computer 205, and specifically the modeling engine 255, determines the updated viscosity profile of the wellbore fluid using the forward model. Specifically, based on the adjusted set of values of the fluid additives and the parameter of the resultant fluid that were identified in step 318, the updated viscosity profile of the wellbore fluid (e.g., fluid 162) is determined using the forward model.

In some implementations, adjusting at least one of the computed set of values of the fluid additives and the at least one parameter of the resultant fluid can include utilizing a genetic algorithm to adjust the at least one of the computed set of values of the fluid additives and the at least one parameter of the resultant fluid. In some aspects, a genetic algorithm is a stochastic global search engine that mimics the metaphor of natural biologic evolution. As a computational intelligent method, genetic algorithms operate on a population of potential solutions applying the principle of "survival of the fittest" to produce improved solutions through multiple generations. At each generation, the fitness of each individual is evaluated based on the user-defined objective function, and an updated population of solutions are created by using genetic operators such as ranking, selection, crossover and mutation. Application of the genetic algorithm may optimize fluid design factors through evolutionary computation.

In addition, some genetic operational parameters are specified for control of computational efficiency and design diversity. For example, given the base fluid type, the target (e.g., desired) viscosity profile and the gel and ion concentrations levels (as identified in steps 302 and 304), the fluid design parameters are iteratively updated through multiple generations (e.g., the cross-linker ("CRL"), the stabilizer ("STB"), the fluid breaker ("FBK"), and the pH level of the resultant fluid). In some examples, the genetic operational parameters can further include population size (e.g., a number of potential solution designs) and the total number of generations (i.e., loop iterations).

Figure 6:
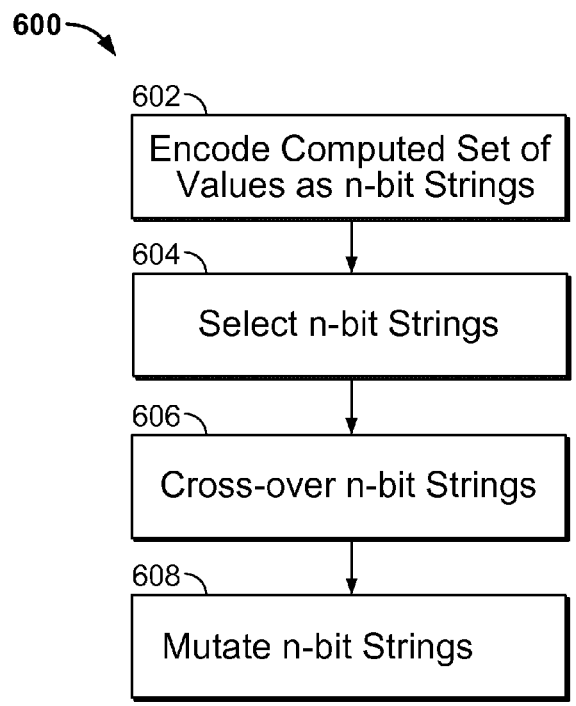
FIG. 6 illustrates an example method for modeling a wellbore fluid using genetic operators.

FIG. 6 is an example flowchart for creating the updated population of solutions by using the genetic operators. For clarity of presentation, the description that follows generally describes method 600 in the context of FIGS. 1 and 2. However, it will be understood that method 600 may be performed, for example, by any other suitable system, environment, software, and hardware, or a combination of systems, environments, software, and hardware as appropriate.

In step 602, the computed set of values of the fluid additives and the at least one parameter of the resultant fluid are encoded as n-bit strings. For example, the computer 205, or the modeling engine 255, encodes the computed set of values of the fluid additives and the at least one parameter of the resultant fluid as n-bit strings. In some implementations, the upper and lower searching boundary for each design parameter (e.g., the values of the fluid additives and the at least one parameter of the resultant fluid) can be determined from the dynamic range of the same parameter in the DOE database. In some examples, the design parameter having a small dynamic range for a single base fluid can be encoded with an 8-bit binary string. In some examples, the design parameter for multi-type fluid systems having a large dynamic range can be encoded with a 12-bit string or longer to achieve a desired resolution. The chromosome (e.g., binary representative of the parameters to be evolved) for all design parameters to be optimized is a combination of strings for each individual design parameter. For example, when an 8bit string is used for each design factor, the total length of chromosome will be 32 bits for a 4-parameter fluid design and 40 bits for a 5-parameter fluid design. However, other encoding techniques may be utilized, for example, non-standard Gray code and real-value based genetic algorithmic applications.

In step 604, one or more of the n-bit strings is selected. For example, the computer 205, or the modeling engine 255, selects the one or more n-bit strings. For example, during each successive generation, a portion of the existing population (e.g., of the current set of values of the fluid additives and the at least one parameter of the resultant fluid) is selected to breed a new generation (e.g., of the updated set of values of the fluid additives and the at least one parameter of the base fluid). Individual solutions are selected through a fitness-based process, where "fitter" solutions (e.g., as measured by a fitness function) are typically more likely to be selected. In some examples, the selection methods rate the fitness of each solution and preferentially select the best solutions.

In step 606, at least two of the selected n-bit strings are crossed-over. For example, the computer, 205, or the modeling engine 255, crosses-over at least two of the selected n-bit strings. Crossover is a genetic operator used to vary the programming of a chromosome or chromosomes (e.g., the computed set of values of the fluid additives and the at least one parameter of the resultant fluid) from one generation to the next. Cross over is a process of taking more than one parent solutions and producing a child solution from them.

In step 608, one or more bits of at least one of the selected n-bit strings is mutated. For example, the computer 205, or the modeling engine 255, mutates one or more bits of at least one of the selected n-bit strings. Specifically, mutation is a genetic operator used to maintain genetic diversity from one generation of a population (e.g., the computed set of values of the fluid additives and the at least one parameter of the resultant fluid) of algorithm chromosomes to the next. Mutation alters one or more gene values in a chromosome (e.g., the n-bit strings) from its initial state. In mutation, the solution may change entirely from the previous solution.

Figure 7:
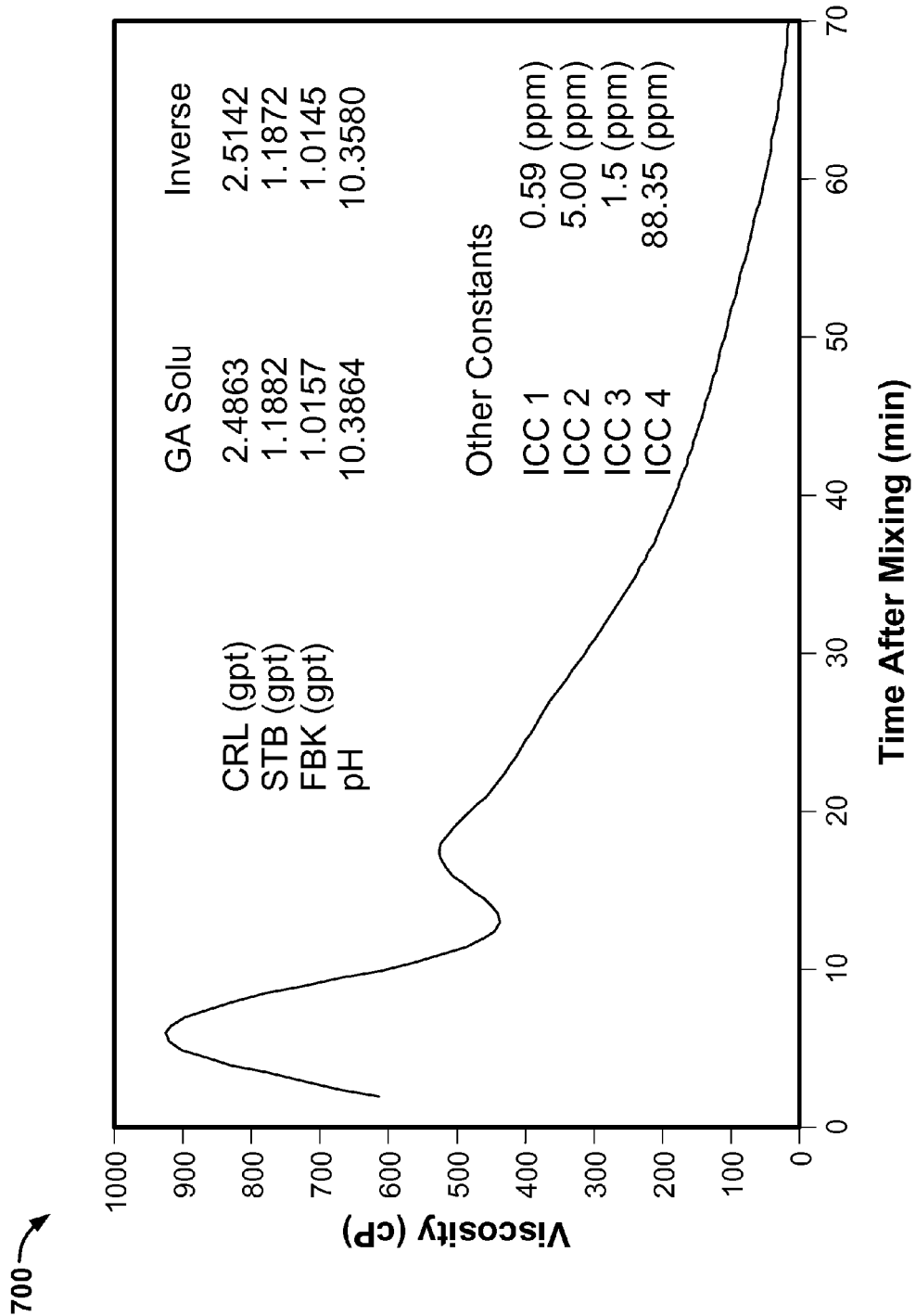
FIGS. 7 and 8A-8D illustrate example viscosity profiles of one or more wellbore fluids.
Figure 8A:
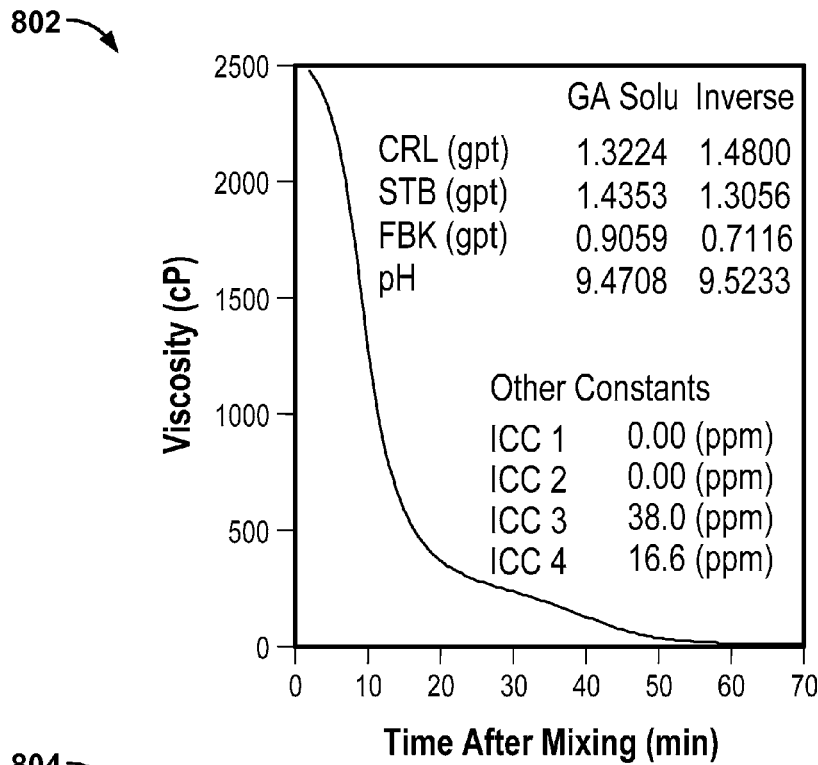
Figure 8B:
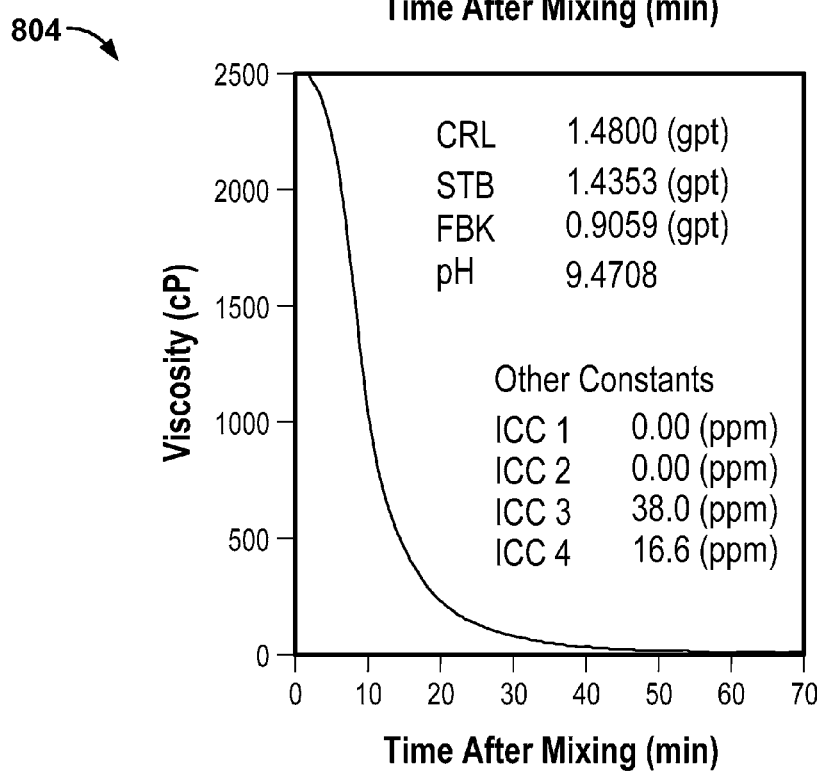
Figure 8C:
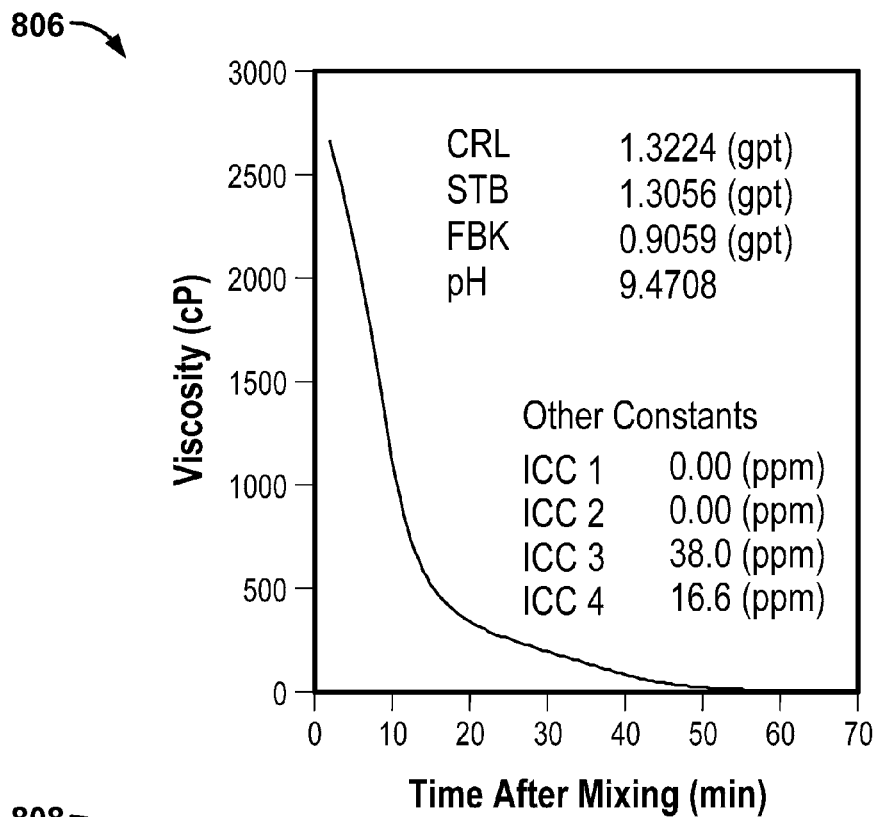
Figure 8D:
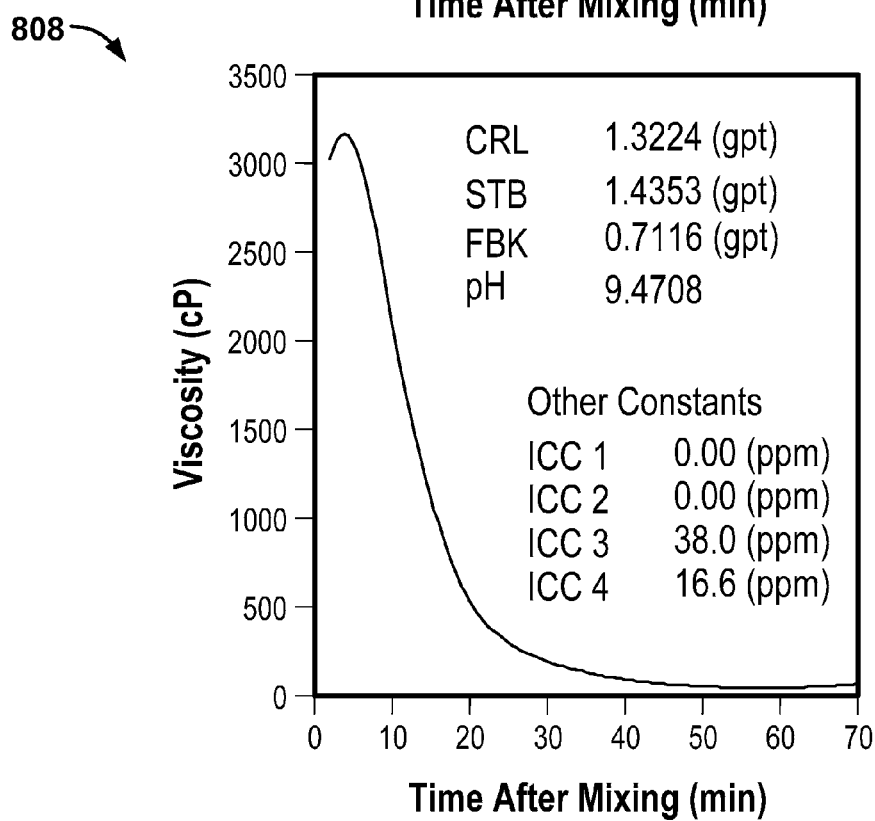

FIG. 7 illustrates an example viscosity profile 700. Specifically, viscosity profile 700 illustrates an appropriate match at selected times of the target (e.g., desired) viscosity profile, and the genetic algorithm best solution of the computed viscosity profile is substantially similar to the prediction of each inverse model. Additionally, the viscosity profile 700 indicates that the optimized (e.g., adjusted or computed values of) the cross-linker concentration ("CRL"), the stabilizer concentration ("STB"), the fluid breaker concentration ("FBK"), and the pH level of the resultant fluid values are within the range of the database (e.g., the DOE database), which provides additional support to the candidate selection. FIG. 7 also illustrates the ion constituent concentrations (ICC) 1-4, which show concentration levels of various ionic constituents such as, for example, iron, iodide, sulfate, boron, and other ions.

FIG. 8A-8D illustrate example viscosity profiles 802, 804, 806, 808 of a different fluid design. Specifically, viscosity profiles 802, 804, 806, 808 illustrate less accurate but still acceptable (e.g., relative to the viscosity profile 700) matches to a target (e.g., desired) viscosity profile. Specifically, although the genetic algorithm solution obtains the desired viscosity profile through forward modeling, differences are observed in the inverse calculation (in step 310) of the CRL, STB, and FBK concentration and the pH level of the resultant fluid. Thus, during re-calculation of the computed viscosity with slightly different inverse parameter (the CRL, STB, and FBK concentrations and the pH level of the resultant fluid) replacement each time, the shape of the viscosity profile is almost unchanged, indicating the computed viscosity is less sensitive to the change of fluid design parameters.

FIGS. 8A-8D also illustrate the constant ion constituent concentrations (ICC) 1-4, which show concentration levels of various ionic constituents such as, for example, iron, iodide, sulfate, boron, and other ions. Note that the case with significant distorted viscosity profile might be observed when the genetic algorithm updated design parameters are highly different from the inversely computed parameters. The problem with dis-convergent fluid formulation design often suggests the need to use different fluid system, e.g., changing gelling agents in the base fluid and applying other appropriate forward and inverse models. Although not discussed in detail, the embodiments described above can extend to the universal fluid system by including gelling agents as an additional fluid design parameter.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method of modeling a wellbore fluid that comprises a base fluid and one or more fluid additives, the method comprising:
   identifying, with a hardware computer processor, a target viscosity profile of the wellbore fluid;
   determining, with the hardware computer processor, an initial set of values of the fluid additives that are based at least in part on the target viscosity profile;
   determining, with the hardware computer processor, with one or more non-linear predictive models, a computed viscosity profile of the wellbore fluid and a computed set of values of the fluid additives based, at least in part, on the initial set of values of the fluid additives;
   determining, with the hardware computer processor, with one or more non-linear predictive models, an inverse computed set of values of the fluid additives based, at least in part, the computed set of values of the fluid additives and the computed viscosity profile;
   comparing, with the hardware computer processor, the computed viscosity profile with the target viscosity profile and at least one of the inverse computed set of values of the fluid additives with at least one of the initial set of values of the fluid additives;
   preparing, with the hardware computer processor, based on the comparison, an output comprising at least one of the computed viscosity profile or the computed set of values; and
   controlling, with the hardware computer processor, one or more properties of the wellbore fluid based on the comparison.

2. The method of claim 1, further comprising:
   identifying, with the hardware computer processor, one or more properties of the base fluid, where identifying a target viscosity profile of the wellbore fluid comprises identifying a target viscosity profile of the wellbore fluid based at least in part on the properties of the base fluid.

3. The method of claim 1, further comprising:
   determining, with the hardware computer processor, at least one parameter of the base fluid based at least in part on the target viscosity profile.

4. The method of claim 1, wherein determining, with one or more non-linear predictive models, a computed viscosity profile of the wellbore fluid and a computed set of values of the fluid additives based, at least in part, on the initial set of values of the fluid additives comprises:
   determining, with the hardware computer processor and a neural network forward model, the computed viscosity profile of the wellbore fluid based, at least in part, on the initial set of values; and
   determining, with the hardware computer processor and a neural network forward model, the computed set of values of the fluid additives and the at least one parameter of the resultant fluid based, at least in part, on the initial set of values.

5. The method of claim 4, further comprising:
   training, with the hardware computer processor, the neural network with historical data comprising viscosity profiles of the wellbore fluid that comprises a conventional water source as the base fluid.

6. The method of claim 1, wherein determining the initial set of values further comprises identifying the initial set of values utilizing a design of experiments database.

7. The method of claim 1, wherein the computed set of values is further based on the target viscosity profile or the computed viscosity profile.

8. The method of claim 1, further comprising:
determining, with the hardware computer processor, based on the comparison, that the computed set of values are within a threshold tolerance of the initial set of values.

9. The method of claim 1, further comprising:
determining, with the hardware computer processor, based on the comparison, that at least one of the computed set of values is not within a threshold tolerance of the initial set of values;
adjusting, with the hardware computer processor, the computed set of values utilizing a genetic algorithm; and
determining, with the hardware computer processor, using a neural network forward model, an updated viscosity profile of the wellbore fluid based on at least the adjusted set of values.

10. The method of claim 9, wherein utilizing the genetic algorithm further comprises:
encoding the computed set of values as n-bit strings;
selecting one or more n-bit strings;
mutating one or more bits of at least one of the selected n-bit strings; and
crossing-over at least two of the selected n-bit strings.

11. The method of claim 1, wherein the one or more properties of the base fluid comprise ion content concentration levels,
the at least one of parameter of the resultant wellbore fluid comprises a pH level, and
the fluid additives comprise a cross-linking constituent, a stabilizer constituent, and a breaker constituent.

12. A non-transitory, machine-readable computer storage medium encoded with a computer program, the program comprising instructions that when executed by one or more computers cause the one or more computers to perform operations comprising:
identifying a target viscosity profile of the wellbore fluid;
determining an initial set of values of the fluid additives that are based at least in part on the target viscosity profile;
determining, with one or more non-linear predictive models, an inverse computed set of values of the fluid additives based, at least in part, the computed set of values of the fluid additives and the computed viscosity profile;
determining, with one or more non-linear predictive models, a computed viscosity profile of the wellbore fluid and a computed set of values of the fluid additives based, at least in part, on the initial set of values of the fluid additives;
comparing the computed viscosity profile with the target viscosity profile and at least one of the inverse computed set of values of the fluid additives with at least one of the initial set of values of the fluid additives;
preparing, based on the comparison, an output comprising at least one of the computed viscosity profile or the computed set of values of a resultant wellbore fluid; and
controlling one or more properties of the wellbore fluid based on the comparison.

13. The non-transitory, machine-readable computer storage medium of claim 12, wherein the operations further comprise:
identifying one or more properties of the base fluid, where identifying a target viscosity profile of the wellbore fluid comprises identifying a target viscosity profile of the wellbore fluid based at least in part on the properties of the base fluid.

14. The non-transitory, machine-readable computer storage medium of claim 12, wherein the operations further comprise:
determining at least one parameter of the resultant wellbore fluid based at least in part on the target viscosity profile.

15. The non-transitory, machine-readable computer storage medium of claim 12, wherein determining, with one or more non-linear predictive models, a computed viscosity profile of the wellbore fluid and a computed set of values of the fluid additives based, at least in part, on the initial set of values of the fluid additives comprises:
determining, with a neural network forward model, the computed viscosity profile of the wellbore fluid based, at least in part, on the initial set of values; and
determining, with a neural network inverse model, the computed set of values of the fluid additives and the at least one parameter of the resultant fluid based, at least in part, on the initial set of values.

16. The non-transitory, machine-readable computer storage medium of claim 15, wherein the operations further comprise:
training the neural network with historical data comprising viscosity profiles of the wellbore fluid that comprises a conventional water source as the base fluid.

17. The non-transitory, machine-readable computer storage medium of claim 12, wherein determining the initial set of values further comprises identifying the initial set of values utilizing a design of experiments database.

18. The non-transitory, machine-readable computer storage medium of claim 12, wherein the computed set of values is further based on the target viscosity profile or the computed viscosity profile.

19. The non-transitory, machine-readable computer storage medium of claim 12, wherein the operations further comprise:
determining, based on the comparison, that the computed set of values are within a threshold tolerance of the initial set of values.

20. The non-transitory, machine-readable computer storage medium of claim 12, wherein the operations further comprise:
determining, based on the comparison, that at least one of the computed set of values is not within a threshold tolerance of the initial set of values;
adjusting the computed set of values utilizing a genetic algorithm; and
determining, using a neural network forward model, an updated viscosity profile of the wellbore fluid based on at least the adjusted set of values.

21. The non-transitory, machine-readable computer storage medium of claim 20, wherein utilizing the genetic algorithm further comprises:
encoding the computed set of values as n-bit strings;
selecting one or more n-bit strings;
mutating one or more bits of at least one of the selected n-bit strings; and
crossing-over at least two of the selected n-bit strings.

22. The non-transitory, machine-readable computer storage medium of claim 12, wherein the one or more properties of the base fluid comprise gelling agents and ion content concentration levels,
the at least one of parameter of the resultant wellbore fluid comprises a pH level, and
the fluid additives comprise a cross-linking constituent, a stabilizer constituent, and a breaker constituent.

23. A system of one or more computers, comprising:
a non-transitory, machine-readable computer storage medium comprising instructions; and
one or more hardware processors that execute the instructions to perform operations comprising:
identifying a target viscosity profile of the wellbore fluid;
determining an initial set of values of the fluid additives that are based at least in part on the target viscosity profile;
determining, with one or more non-linear predictive models, a computed viscosity profile of the wellbore fluid and a computed set of values of the fluid additives based, at least in part, on the initial set of values of the fluid additives;
determining, with one or more non-linear predictive models, an inverse computed set of values of the fluid additives based, at least in part, the computed set of values of the fluid additives and the computed viscosity profile;
comparing the computed viscosity profile with the target viscosity profile and at least one of the inverse computed set of values of the fluid additives with at least one of the initial set of values of the fluid additives;
preparing, based on the comparison, an output comprising the computed viscosity profile and at least one of the computed set of values of a resultant wellbore fluid; and
controlling one or more properties of the wellbore fluid based on the comparison.

24. The system of claim 23, wherein the operations further comprise:
identifying one or more properties of the base fluid, where identifying a target viscosity profile of the wellbore fluid comprises identifying a target viscosity profile of the wellbore fluid based at least in part on the properties of the base fluid.

25. The system of claim 23, wherein the operations further comprise:
determining at least one parameter of the resultant fluid based at least in part on the target viscosity profile.

26. The system of claim 23, wherein determining, with one or more non-linear predictive models, a computed viscosity profile of the wellbore fluid and a computed set of values of the fluid additives based, at least in part, on the initial set of values of the fluid additives comprises:
determining, with a neural network forward model, the computed viscosity profile of the wellbore fluid based, at least in part, on the initial set of values; and
determining, with a neural network inverse model, the computed set of values of the fluid additives and the at least one parameter of the resultant wellbore fluid based, at least in part, on the initial set of values.

27. The system of claim 26, wherein the operations further comprise:
training the neural network with historical data comprising viscosity profiles of the wellbore fluid that comprises a conventional water source as the base fluid.

28. The system of claim 23, wherein determining the initial set of values further comprises identifying the initial set of values utilizing a design of experiments database.

29. The system of claim 12, wherein the computed set of values is further based on the target viscosity profile or the computed viscosity profile.

30. The system of claim 23, wherein the operations further comprise:
determining, based on the comparison, that the computed set of values are within a threshold tolerance of the initial set of values.

31. The system of claim 23, wherein the operations further comprise:
determining, based on the comparison, that at least one of the computed set of values is not within a threshold tolerance of the initial set of values;
adjusting the computed set of values utilizing a genetic algorithm; and
determining, using a neural network forward model, an updated viscosity profile of the wellbore fluid based on at least the adjusted set of values.

32. The system of claim 31, wherein utilizing the genetic algorithm further comprises:
encoding the computed set of values as n-bit strings;
selecting one or more n-bit strings;
mutating one or more bits of at least one of the selected n-bit strings; and
crossing-over at least two of the selected n-bit strings.

33. The system of claim 23, wherein the one or more properties of the base fluid comprise gelling agents and ion content concentration levels,
the at least one of parameter of the resultant wellbore fluid comprises a pH level, and
the fluid additives comprise a cross-linking constituent, a stabilizer constituent, and a breaker constituent.

34. The method of claim 1, wherein the wellbore fluid comprises a fracturing fluid.

35. The method of claim 34, wherein controlling one or more properties of the wellbore fluid based on the comparison comprises controlling the one or more properties of the fracturing fluid based on the comparison during a fracturing operation.

* * * * *